June 2, 1925.
W. C. GULDE
EYESHADE
Original Filed Dec. 21, 1923
1,540,615
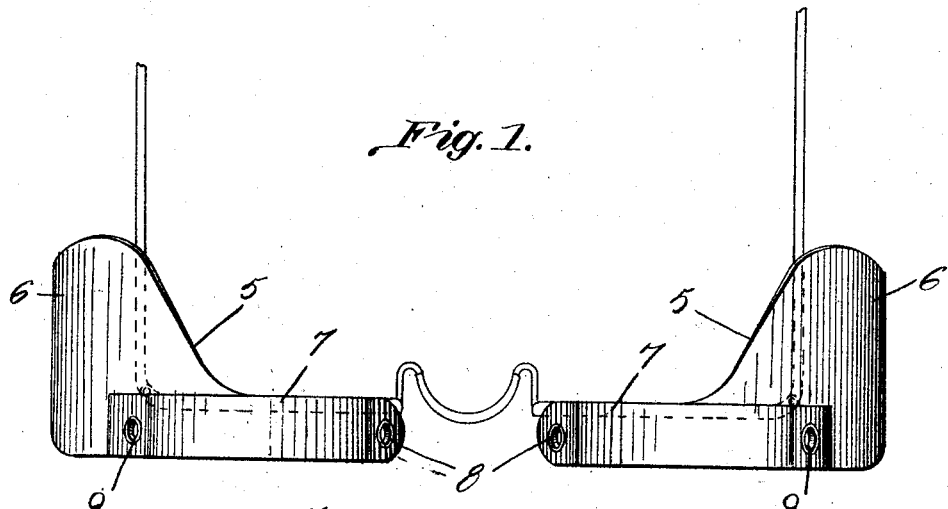
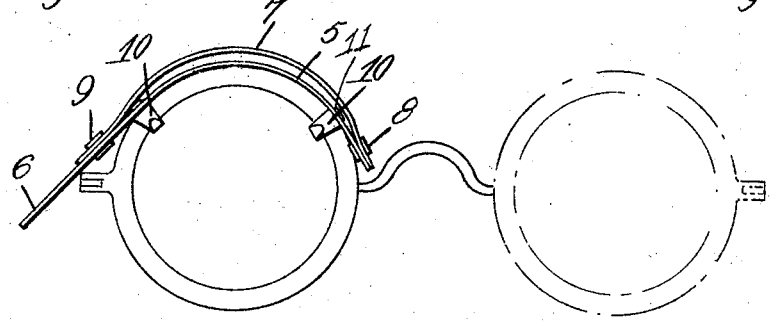
Fig. 2.
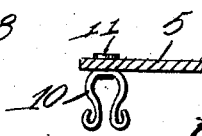
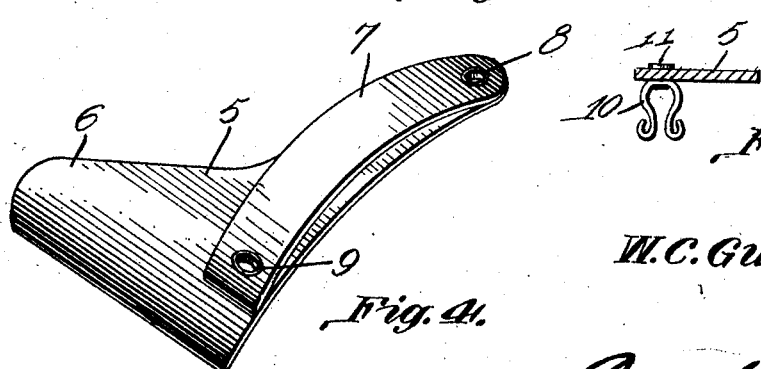
Fig. 3.
W. C. Gulde, Inventor
Fig. 4.
By C. A. Snow & Co.
Attorneys Patented June 2, 1925.

1,540,615

UNITED STATES PATENT OFFICE.

WILLIAM C. GULDE, OF ST. PAUL, MINNESOTA.

EYESHADE.

Application filed December 21, 1923, Serial No. 682,017. Renewed November 1, 1924.

*To all whom it may concern:*

Be it known that I, WILLIAM C. GULDE, a citizen of the United States, residing at St. Paul, in the county of Ramsey and State of Minnesota, have invented a new and useful Eyeshade, of which the following is a specification.

This invention relates to eye shades and more particularly to eye shades especially designed for attachment to eye glasses or the like.

The primary object of the invention is to provided a device of this character which may be readily and easily positioned over the frame of eye glasses, novel means being provided for gripping the frame to prevent accidental displacement of the device.

Another object of the invention is to provide a device of this character which may be readily carried in the pocket of the user, the device being comparatively small requiring but little space in the pocket of the user.

A still further object of the invention is to provide a body portion formed of translucent material curved to conform to the curvature of an eye glass frame, novel means being provided for holding the body portion in its curved condition.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view disclosing shields constructed in accordance with the invention as secured to eye glasses.

Figure 2 is a front elevational view disclosing one of the shields as applied.

Figure 3 is a sectional view disclosing one of the clamping members in elevation.

Figure 4 is a perspective view of one of the shields.

Referring to the drawing in detail, the shield includes a body portion indicated at 5 which body portion is formed with a widened rearwardly extended portion 6, the inner edge thereof being curved to conform to the curvature of the forehead of the person using the eye glasses.

This body portion is formed preferably of a colored translucent material, such as celluloid or the like, whereby light may pass through the shield, but at the same time reduce the light eliminating glare.

In order that the body portion will be held in a curved condition to permit the same to be readily positioned over an eye glass frame, a strip 7 of translucent material has one of its ends secured to the body portion 5 at 8, the opposite end thereof being secured to the body portion at 9, the secured ends causing the central portion of the strip 7 to bulge, resulting in the body portion 5 being held curved.

The body portion 5 is secured to the frame of eye glasses by means of the clamping members 10, each of which includes a pair of spring arms adapted to be forced over the frame of the eye glass, where the spring arms grip the frame and support the shield by their frictional contact with the eye glass frame. Rivets 11 are employed for securing the clamping members 10 to the body portions 5, the rivets providing swivels whereby clamping members may be moved to adjust themselves and properly support the shields.

From the foregoing it will be obvious that by positioning shields of this character on an eye glass frame, the eyes of a user will be guarded against glaring light rays.

I claim:—

An eye shield including a body portion formed of translucent flexible material, a flexible member of translucent material of a length less than the length of the body portion, secured to the outer surface of the body portion, said body portion adapted to be curved, the second mentioned flexible member being curved to a greater degree than the body portion to hold the body portion in its curved condition, and securing means for securing the body portion to an eye glass frame.

In testimony that I claim the foregoing as my own, I have hereto affixed my signature in the presence of two witnesses.

WILLIAM C. GULDE.

Witnesses:
W. A. WEATHERFORD,
C. O. BENSEN.